No. 692,482. Patented Feb. 4, 1902.
C. C. ROSS.
HAND PLANTER.
(Application filed Aug. 21, 1901.)
(No Model.)

Witnesses:

Inventor:
Charles C. Ross
by B. Pickering Atty

UNITED STATES PATENT OFFICE.

CHARLES C. ROSS, OF BEAVER CREEK TOWNSHIP, OHIO.

HAND-PLANTER.

SPECIFICATION forming part of Letters Patent No. 692,482, dated February 4, 1902.

Application filed August 21, 1901. Serial No. 72,799. (No model.)

*To all whom it may concern:*

Be it known that I, CHARLES C. ROSS, a citizen of the United States, residing in Beaver Creek township, in the county of Greene and State of Ohio, have invented certain new and useful Improvements in Hand-Planters; and I do hereby declare that the following is a full, clear, and exact description of the invention, which will enable others skilled in the art to which it appertains to make and use the same, reference being had to the accompanying drawings, and to the letters and numerals of reference marked thereon, which form a part of this specification.

My invention relates to improvements in hand-planters, the features of which will be fully hereinafter described and claimed.

The objects of my invention are to place tobacco or other plants in the soil and to supply water to the same. The objects are accomplished by the mechanism illustrated in the accompanying drawings, in which—

Figure 1:
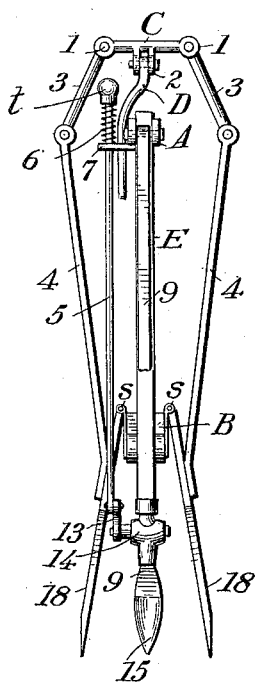
Figure 2:
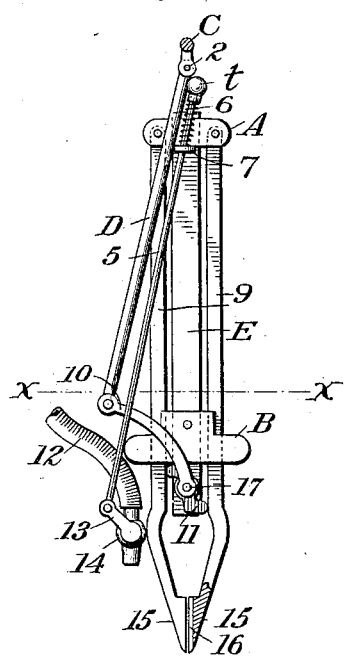
Figure 3:
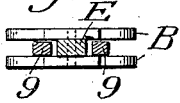

Figure 1 is a front elevation of the device with parts omitted. Fig. 2 is a side view of the same with parts omitted. Fig. 3 is a transverse section on line $x$, Fig. 2, with the connection-rods omitted.

Like letters and numerals designate like parts throughout the several views.

The supporting-frame comprises the rail E, to which is rigidly attached the cross-head A at the top and the cross-head B at the bottom, each having two like parts, between which are held the former. Within the upper cross-head are pivoted the bars 9 9, and these have the projecting parts of the lower cross-head as guides, in which they freely traverse. These bars terminate in points 15 15, above which are concavities for the reception of the bodies of the plants, and beneath are semicircular grooves 16 for the reception of the roots.

To the ears 2 of handle C (shown complete in Fig. 1 and in section in Fig. 2) is jointed the connection-rod D, the lower end of which is joined to the arm 10, which is rigidly attached to the spindle 17, held in rail E, and to this spindle is attached the pivotal plate 11, engaging the inner surfaces of the bars to expand them for the reception of the plants as the handle is pressed downward. This rod is curved sufficiently outward to pass the side of the upper cross-head.

To the lower cross-head are hinged the hoes 18 18 at $s\ s$. To said hoes are rigidly attached the connection-rods 4 4, and these are joined with the handle by the connection-rods 3 3 at the eared ends 1 1. The hoes after the plant is carried into the soil by the points 15 carry the soil to said plant and are operated by pressing the handle downward.

To the bar to the right is attached the stop-cock 14, and to the plug of which is attached the arm 13, and the rod 5 is supported in an orifice of the plate 7, attached to the upper cross-head. To the top of this rod is attached the head $t$, and between this and the plate is the spiral spring 6. When this rod is pressed down, the water flows through the stop-cock, and when the pressure ceases the spiral spring closes the same. The operator has mounted on his back a vessel filled with water, and the tube 12 leads from said vessel to the stop-cock and thence to the soil. The operation is thus: The points are opened by depressing the handle, the plant is placed within the lower ends of said points, and these are closed by the hand, and then said points are thrust into the soil with the handle elevated, then again depressing the handle the hoes in closing carry the soil about the plant.

Having described my invention, what I claim is—

1. In a hand-planter the combination of the frame provided with the upper cross-head and the lower cross-head, the bars pivoted in said upper cross-head and traversing said lower cross-head, and the points of said bars provided with suitable cavities to receive the body and roots of plants, substantially as described.

2. In a hand-planter the combination of the frame provided with the upper cross-head and the lower cross-head, the bars pivoted in said upper cross-head and traversing said lower cross-head, the expanding-plate having spindle pivoted in said frame, the arm attached to said spindle, the connection-rod D and the handle, substantially as described.

3. In a hand-planter the combination of the frame provided with upper and lower cross-heads, the hoes hinged to the sides of the lower cross-head, the connection-rods 4 4 and 3 3, and the handle to give a central movement to said hoes, substantially as described.

4. In a hand-planter the combination of the frame provided with the upper and lower cross-heads, the bar provided with points 15 pivoted within the upper cross-head, the stop-cock attached to said bar, the arm attached to the plug of said stop-cock, the rod 5, the plate 7 of the upper cross-head and the spiral spring 6 to close said stop-cock, substantially as described.

5. In a hand-planter the combination of the frame, the handle C, connection-rods 3 3 and 4 4, the hoes hinged to said frame, the bars 9 provided with points 15 pivoted to said frame, the rod D pivoted to said handle, the arm 10, and the expanding-plate 11 held on a spindle supported in the rail E, substantially as described.

In testimony that I claim the foregoing as my own I affix my signature in presence of two witnesses.

CHARLES C. ROSS.

Witnesses:
B. PICKERING,
H. O. COX.